US008574062B2

(12) United States Patent
Giobbi et al.

(10) Patent No.: US 8,574,062 B2
(45) **Date of Patent: *Nov. 5, 2013**

(54) SYSTEM AND METHOD FOR SAVING STATUS OF PAUSED GAME OF CHANCE

(75) Inventors: John J. Giobbi, Northbrook, IL (US); Larry J. Pacey, Prospect Heights, IL (US)

(73) Assignee: WMS Gaming Inc., Waukegan, IL (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/880,630

(22) Filed: Sep. 13, 2010

(65) Prior Publication Data

US 2010/0331069 A1 Dec. 30, 2010

Related U.S. Application Data

(63) Continuation of application No. 11/519,463, filed on Sep. 12, 2006, now Pat. No. 7,811,167, which is a continuation of application No. 10/854,352, filed on May 26, 2004, now Pat. No. 7,182,690, which is a continuation of application No. 09/891,010, filed on Jun. 25, 2001, now Pat. No. 6,800,027, which is a continuation-in-part of application No. 09/538,934, filed on Mar. 31, 2000, now Pat. No. 6,592,457, which is a continuation-in-part of application No. 09/318,903, filed on May 26, 1999, now Pat. No. 6,443,837, and a continuation-in-part of application No. 09/393,492, filed on Sep. 10, 1999, now Pat. No. 6,270,411.

(51) Int. Cl.
*A63F 13/00* (2006.01)

(52) U.S. Cl.
USPC .......... 463/24

(58) Field of Classification Search
USPC .......... 463/24
See application file for complete search history.

(56) References Cited

U.S. PATENT DOCUMENTS 3,281,149 A 10/1966 Miller .......... 273/143
4,095,795 A 6/1978 Saxton et al. .......... 273/143 R (Continued)

FOREIGN PATENT DOCUMENTS

DE 37 00 861 7/1988
DE 40 14 477 7/1991

(Continued)

OTHER PUBLICATIONS

Advertisement for “Acropolis,” Automatic (Fruit) Designs, Ltd., 2 pages (date unknown).

(Continued)

*Primary Examiner* — Sunit Pandya
*Assistant Examiner* — Jeffrey Wong
(74) *Attorney, Agent, or Firm* — Nixon Peabody LLP

(57) ABSTRACT

A game of chance involving a progression of events is conducted on one or more gaming machines. After receiving a wager from a player at a gaming machine, play of the game is initiated. If the game is paused, the status of the paused game is stored at a central database linked to and remote from the gaming machine. This game status is associated with a personal identifier of the player. To continue play of the game beginning from a point at which the game was paused, the personal identifier is provided to the central database via the same or another gaming machine and the game status associated with the personal identifier is retrieved from the central database.

22 Claims, 6 Drawing Sheets

(56) References Cited

U.S. PATENT DOCUMENTS

| | | | | |
|---|---|---|---|---|
| 4,306,768 | A | 12/1981 | Egging | 350/174 |
| 4,335,809 | A | 6/1982 | Wain | 194/1 R |
| 4,448,419 | A | 5/1984 | Telnaes | 273/143 R |
| 4,508,345 | A | 4/1985 | Okada | 273/143 R |
| 4,624,459 | A | 11/1986 | Kaufman | 273/143 R |
| 4,721,307 | A | 1/1988 | Okada | 273/143 R |
| 4,752,068 | A | 6/1988 | Endo | 463/15 |
| 4,763,256 | A | 8/1988 | DeMar | 364/410 |
| 4,772,023 | A | 9/1988 | Okada | 273/143 R |
| 4,805,907 | A | 2/1989 | Hagiwara | 273/138 A |
| 4,871,171 | A | 10/1989 | Rivero | 273/138 A |
| 5,083,785 | A | 1/1992 | Okada | 273/143 R |
| 5,169,147 | A | 12/1992 | Hamano | 273/138 A |
| 5,205,555 | A | 4/1993 | Hamano | 273/143 R |
| 5,259,616 | A | 11/1993 | Bergmann | 273/138 A |
| 5,292,127 | A | 3/1994 | Kelly et al. | 273/138 R |
| 5,342,047 | A | 8/1994 | Heidel et al. | 273/85 CP |
| 5,342,049 | A | 8/1994 | Wichinsky et al. | 271/119 R |
| 5,380,008 | A | 1/1995 | Mathis et al. | 273/143 R |
| 5,386,903 | A | 2/1995 | Rothschild et al. | 194/350 |
| 5,393,057 | A | 2/1995 | Marnell, II | 273/85 CP |
| 5,401,024 | A | 3/1995 | Simunek | 273/138 A |
| 5,415,404 | A | 5/1995 | Joshi et al. | 273/138 A |
| 5,423,541 | A | 6/1995 | Nicastro et al. | 273/143 R |
| 5,429,361 | A | 7/1995 | Raven et al. | 273/138 A |
| 5,431,492 | A | 7/1995 | Rothschild et al. | 312/229 |
| 5,449,173 | A | 9/1995 | Thomas et al. | 273/143 R |
| 5,456,465 | A | 10/1995 | Durham | 273/138 A |
| 5,456,466 | A | 10/1995 | Miles | 273/143 R |
| 5,456,468 | A | 10/1995 | Stringfellow et al. | 273/148 B |
| 5,472,197 | A | 12/1995 | Gwiasda et al. | 273/143 R |
| 5,542,669 | A | 8/1996 | Charron et al. | 463/13 |
| 5,547,192 | A | 8/1996 | Ishibashi | 463/26 |
| 5,558,197 | A | 9/1996 | Rothschild et al. | 194/344 |
| 5,569,084 | A | 10/1996 | Nicastro et al. | 463/20 |
| 5,575,474 | A | 11/1996 | Rossides et al. | 463/26 |
| 5,575,717 | A | 11/1996 | Houriet, Jr. et al. | 463/1 |
| 5,609,525 | A | 3/1997 | Ohno et al. | 463/43 |
| 5,624,119 | A | 4/1997 | Leake | 273/269 |
| 5,647,798 | A | 7/1997 | Falciglia | 463/19 |
| 5,664,781 | A | 9/1997 | Feola | 273/292 |
| 5,683,296 | A | 11/1997 | Rasmussen | 463/20 |
| 5,697,843 | A | 12/1997 | Manship et al. | 463/20 |
| 5,704,835 | A | 1/1998 | Dietz, II | 463/20 |
| 5,722,891 | A | 3/1998 | Inoue | 463/20 |
| 5,769,714 | A | 6/1998 | Wiener et al. | 463/3 |
| 5,772,509 | A | 6/1998 | Weiss | 463/16 |
| 5,779,545 | A | 7/1998 | Berg et al. | 463/22 |
| 5,788,573 | A | 8/1998 | Baerlocher et al. | 463/16 |
| 5,823,874 | A | 10/1998 | Adams | 463/17 |
| 5,833,537 | A | 11/1998 | Barrie | 463/21 |
| 5,848,932 | A | 12/1998 | Adams | 463/20 |
| 5,876,275 | A | 3/1999 | Rasmussen | 453/32 |
| 5,951,397 | A | 9/1999 | Dickinson | 463/36 |
| 5,957,775 | A | 9/1999 | Cherry et al. | 463/16 |
| 5,967,518 | A | 10/1999 | Rowe | 273/317.5 |
| 6,004,207 | A | 12/1999 | Wilson, Jr. et al. | 463/20 |
| 6,004,211 | A | 12/1999 | Brenner et al. | 463/40 |
| 6,007,427 | A | 12/1999 | Wiener et al. | 463/17 |
| 6,012,045 | A | 1/2000 | Barzilai | 705/37 |
| 6,012,983 | A | 1/2000 | Walker et al. | 463/20 |
| 6,015,344 | A | 1/2000 | Kelly et al. | 463/16 |
| 6,059,289 | A | 5/2000 | Vancura | 273/143 R |
| 6,068,553 | A | 5/2000 | Parker | 463/27 |
| 6,077,163 | A | 6/2000 | Walker et al. | 463/26 |
| 6,089,976 | A | 7/2000 | Schneider et al. | 463/16 |
| 6,102,394 | A | 8/2000 | Wurz et al. | 273/138.2 |
| 6,113,098 | A | 9/2000 | Adams | 273/143 |
| 6,117,009 | A | 9/2000 | Yoseloff | 463/20 |
| 6,117,010 | A | 9/2000 | Canterbury et al. | 463/20 |
| 6,129,355 | A | 10/2000 | Hahn et al. | 273/142 R |
| 6,135,884 | A | 10/2000 | Hedrick et al. | 463/20 |
| 6,135,885 | A | 10/2000 | Lermusiaux | 463/20 |
| 6,155,925 | A | 12/2000 | Giobbi et al. | 463/20 |
| 6,159,095 | A | 12/2000 | Frohm et al. | 463/19 |
| 6,159,097 | A | 12/2000 | Gura | 463/20 |
| 6,159,098 | A | 12/2000 | Slomiany et al. | 463/25 |
| 6,165,071 | A * | 12/2000 | Weiss | 463/24 |
| 6,190,255 | B1 | 2/2001 | Thomas et al. | 463/20 |
| 6,203,428 | B1 | 3/2001 | Giobbi et al. | 463/16 |
| 6,203,429 | B1 | 3/2001 | Demar et al. | 463/20 |
| 6,234,896 | B1 | 5/2001 | Walker et al. | 463/16 |
| 6,234,897 | B1 | 5/2001 | Frohm et al. | 463/20 |
| 6,254,481 | B1 | 7/2001 | Jaffe | 463/20 |
| 6,270,411 | B1 | 8/2001 | Gura et al. | 463/20 |
| 6,273,820 | B1 | 8/2001 | Haste, III | 463/40 |
| 6,287,194 | B1 | 9/2001 | Okada et al. | 463/16 |
| 6,302,790 | B1 | 10/2001 | Brossard | 463/20 |
| 6,302,791 | B1 | 10/2001 | Frohm et al. | 463/21 |
| 6,311,976 | B1 | 11/2001 | Yoseloff et al. | 273/138 |
| 6,315,660 | B1 | 11/2001 | DeMar et al. | 463/16 |
| 6,319,127 | B1 | 11/2001 | Walker et al. | 463/26 |
| 6,322,309 | B1 | 11/2001 | Thomas et al. | 413/20 |
| 6,334,612 | B1 | 1/2002 | Wurz et al. | 273/143 R |
| 6,347,996 | B1 | 2/2002 | Gilmore et al. | 463/17 |
| 6,358,147 | B1 | 3/2002 | Jaffe et al. | 463/20 |
| 6,364,314 | B1 | 4/2002 | Canterbury | 273/274 |
| 6,364,765 | B1 | 4/2002 | Walker et al. | 463/26 |
| 6,364,766 | B1 | 4/2002 | Anderson et al. | 463/16 |
| 6,365,765 | B1 | 4/2002 | Baldwin et al. | 556/440 |
| 6,420,972 | B1 | 7/2002 | Loose | 340/545.1 |
| 6,428,412 | B1 | 8/2002 | Anderson et al. | 463/9 |
| 6,431,983 | B2 | 8/2002 | Acres | 463/25 |
| 6,506,117 | B2 | 1/2003 | DeMar | 463/20 |
| 6,506,118 | B1 | 1/2003 | Baerlocher et al. | 463/25 |
| 6,592,457 | B1 | 7/2003 | Frohm et al. | 463/16 |
| 6,663,489 | B2 | 12/2003 | Baerlocher | 463/20 |
| 6,722,981 | B2 | 4/2004 | Kaminkow | 463/20 |
| 6,722,985 | B2 | 4/2004 | Criss-Puszkiewicz et al. | 463/29 |
| 6,745,236 | B1 | 6/2004 | Hawkins et al. | 709/203 |
| 6,758,757 | B2 | 7/2004 | Luciano et al. | 463/43 |
| 6,776,713 | B2 | 8/2004 | Gauselmann | 463/16 |
| 6,780,111 | B2 | 8/2004 | Cannon et al. | 463/25 |
| 6,800,027 | B2 | 10/2004 | Giobbi et al. | 463/24 |
| 6,811,486 | B1 | 11/2004 | Luciano, Jr. | 463/24 |
| 6,923,721 | B2 | 8/2005 | Luciano et al. | 463/24 |
| 7,182,690 | B2 | 2/2007 | Giobbi et al. | 463/24 |
| 2001/0024971 | A1 | 9/2001 | Brossard | 463/30 |
| 2001/0046893 | A1 | 11/2001 | Giobbi et al. | 463/24 |
| 2002/0028708 | A1 | 3/2002 | Busch et al. | 463/42 |
| 2002/0039919 | A1 | 4/2002 | Joshi et al. | 463/20 |
| 2002/0077173 | A1 | 6/2002 | Luciano, Jr. et al. | 463/23 |
| 2002/0077174 | A1 | 6/2002 | Luciano et al. | 463/25 |
| 2002/0093136 | A1 | 7/2002 | Moody | 273/139 |
| 2002/0094871 | A1 | 7/2002 | Luciano, Jr. et al. | 463/43 |
| 2002/0107065 | A1 | 8/2002 | Rowe | 463/20 |
| 2002/0151349 | A1 | 10/2002 | Joshi | 463/20 |
| 2002/0196342 | A1 | 12/2002 | Walker et al. | 348/157 |
| 2003/0013515 | A1 | 1/2003 | Rowe et al. | 463/25 |
| 2003/0013531 | A1 | 1/2003 | Rowe et al. | 463/42 |
| 2003/0036422 | A1 | 2/2003 | Baerlocher et al. | 463/20 |
| 2003/0036427 | A1 | 2/2003 | Brandstetter et al. | 463/29 |
| 2003/0064794 | A1 | 4/2003 | Mead et al. | 463/25 |
| 2003/0078101 | A1 | 4/2003 | Schneider et al. | 463/42 |
| 2003/0100362 | A1 | 5/2003 | Horniak et al. | 463/25 |
| 2003/0106769 | A1 | 6/2003 | Weiss | 194/201 |
| 2003/0114219 | A1 | 6/2003 | McClintic | 463/25 |
| 2003/0119579 | A1 | 6/2003 | Walker et al. | 463/20 |
| 2003/0157979 | A1 | 8/2003 | Cannon et al. | 463/16 |
| 2003/0195024 | A1 | 10/2003 | Slattery | 463/9 |
| 2003/0211881 | A1 | 11/2003 | Walker et al. | 463/20 |
| 2004/0053680 | A1 | 3/2004 | Schultz | 463/20 |
| 2004/0142742 | A1 | 7/2004 | Schneider et al. | 463/25 |
| 2004/0209662 | A1 | 10/2004 | Wadleigh | 463/16 |
| 2005/0003886 | A1 | 1/2005 | Englman et al. | 463/25 |
| 2005/0159207 | A1 | 7/2005 | Thomas | 463/20 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/20 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2007/0259706 | A1 | 11/2007 | Anderson et al. | 463/16 |
| 2007/0259713 | A1 | 11/2007 | Fiden et al. | 463/25 |

(56) References Cited

U.S. PATENT DOCUMENTS

| | | | | |
|---|---|---|---|---|
| 2007/0265060 A1 | 11/2007 | Hornik et al. | .................. | 463/20 |
| 2007/0298856 A1 | 12/2007 | Gilmore et al. | ................. | 463/16 |
| 2008/0113770 A1 | 5/2008 | Gelber et al. | .................. | 463/25 |

FOREIGN PATENT DOCUMENTS

| | | |
|---|---|---|
| EP | 0142371 | 5/1985 |
| EP | 0148001 | 7/1985 |
| EP | 0333338 | 9/1989 |
| EP | 0577415 | 1/1994 |
| FR | 1474617 | 3/1967 |
| GB | 1129607 | 10/1968 |
| GB | 1476848 | 6/1977 |
| GB | 1591623 | 6/1981 |
| GB | 2066991 | 7/1981 |
| GB | 2072395 | 9/1981 |
| GB | 2083936 | 3/1982 |
| GB | 2084371 | 4/1982 |
| GB | 2096376 | 10/1982 |
| GB | 2097160 | 10/1982 |
| GB | 2105891 | 3/1983 |
| GB | 2106685 | 4/1983 |
| GB | 2117952 | 10/1983 |
| GB | 2147442 | 5/1985 |
| GB | 2147773 | 5/1985 |
| GB | 2152262 | 7/1985 |
| GB | 2153572 | 8/1985 |
| GB | 2157047 | 10/1985 |
| GB | 2165385 | 4/1986 |
| GB | 2170636 | 8/1986 |
| GB | 2180087 | 3/1987 |
| GB | 2181589 | 4/1987 |
| GB | 2183882 | 6/1987 |
| GB | 2191030 | 12/1987 |
| GB | 2197974 | 6/1988 |
| GB | 2202984 | 10/1988 |
| GB | 2204436 | 11/1988 |
| GB | 2210191 | 6/1989 |
| GB | 2222712 | 3/1990 |
| GB | 2226907 | 7/1990 |
| GB | 2229565 | 9/1990 |
| GB | 2230373 | 10/1990 |
| GB | 2233806 | 1/1991 |
| GB | 2242300 | 9/1991 |
| GB | 2253154 | 9/1992 |
| GB | 2262642 | 6/1993 |
| GB | 2270787 | 3/1994 |
| GB | 2273384 | 8/1994 |
| GB | 2287567 | 9/1995 |
| GB | 2297857 | 8/1996 |
| GB | 2298508 | 9/1996 |
| WO | WO 88/08179 | 10/1988 |
| WO | WO 89/12875 | 12/1989 |
| WO | WO 92/10818 | 6/1992 |
| WO | WO 94/01840 | 1/1994 |
| WO | WO 99/29381 | 6/1999 |
| WO | WO 2005/082480 | 9/2005 |
| WO | WO 2006/002241 | 1/2006 |
| WO | WO 2006/004831 | 1/2006 |
| WO | WO 2006/004832 | 1/2006 |
| WO | WO 2006/005073 | 1/2006 |
| WO | WO 2006/017036 | 2/2006 |
| WO | WO 2006/017067 | 2/2006 |
| WO | WO 2006/017068 | 2/2006 |
| WO | WO 2006/020811 | 2/2006 |
| WO | WO 2006/026250 | 3/2006 |
| WO | WO 2006/044252 | 4/2006 |
| WO | WO 2007/103054 | 9/2007 |
| WO | WO 2008/048634 | 4/2008 |

OTHER PUBLICATIONS

Advertisement for "Adders & Ladders," Barcrest, 2 pages (date unknown).

Advertisement for "Bonus Card," Andries Robert Automatic s.p.r.l., 1 page (date unknown).

Advertisement for "Club Double," M-D-M Coin Sales Ltd., 2 pages (date unknown).

Advertisement for "Club Make a Million," Bell-Fruit Manufacturing Co., Ltd., 2 pages (date unknown).

Advertisement for "Club Vegas," Barcrest, 1 page (date unknown).

Advertisement for "Colossus," AFD, 1 page (date unknown).

Advertisement for "Fortune Wheel," Project Customer Services, 2 pages (date unknown).

Advertisement for "Golden Circle," Delta Automaten, 1 page (date unknown).

Advertisement for "Happy Clown," Andries Robert Automatic s.p.r.l., 1 page (date unknown).

Advertisement for "Instant Jackpots," Bell-Fruit Manufacturing Co., Ltd., 2 pages (date unknown).

Advertisement for "Jackpot Stampede," WMS Gaming Inc., 2 pages (date unknown).

Advertisement for "Lucky Bank," 1 page (date unknown).

Advertisement for "Lucky Horseshoes," JPM Automatic Machines Ltd., 2 pages (date unknown).

Advertisement for "Lucky Jackpots," JPM Automatic Machines Ltd., 2 pages (date unknown).

Advertisement for "Main Attraction," Bell-Fruit Manufacturing Co., Ltd., 2 pages (date unknown).

Advertisement for "Midas Touch," 2 pages (date unknown).

Advertisement for "MONOPOLY," JPM Automatic Machines Ltd., 2 pages (date unknown).

Advertisement for "Monopoly: Maygay There for the Taking," 2 pages (date unknown).

Advertisement for "Only Fools and Horses," Bell-Fruit Manufacturing Co., Ltd., 2 pages (date unknown).

Advertisement for "Premier Club Manager," Bell-Fruit Manufacturing, 2 pages (date unknown).

Advertisement for "Road Hog," Barcrest, 2 pages (date unknown).

Advertisement for "Super Square," Maygay Machines Ltd., 2 pages (date unknown).

Advertisement for "The Big Breakfast," Channel Four Television Corporation, 2 pages (1993).

Advertisement for "The Wild West," Bell-Fruit Manufacturing, 2 pages (date unknown).

Advertisement for "Treasure Island," American Alpha, Inc., 1 page (date unknown).

Advertisement for "Viva Club Vegas!," Barcrest, 1 page (date unknown).

Advertisement for "Viva! Six! Las Vegas," Barcrest, 2 pages (date unknown).

Advertisement for "Wheel of Fortune," Project Creating Entertainment, 2 pages (date unknown).

Advertisement for Barcrest Limited, 1 page (date unknown).

Article titled "Bangkok on the Brink," *Euroslot. The International Coin-Operated Machine Journal*, 2 pages (Nov. 1993).

Article titled "Scandinavia on the Brink of the EU melting pot," *Euroslot. The International Coin-Operated Machine Journal*, 2 pages (Aug. 1994).

Bally Bingo Advertisement for excerpt from "Lemons, Cherries and Bell Fruit Gum," Richard M. Bueschel, 1 page (date unknown).

Bally Circus Advertisement for excerpt from "Lemons, Cherries and Bell Fruit Gum," Richard M. Bueschel, 3 pages (date unknown).

Brochure for "JPM Presents MONOPOLY Deluxe," JPM International Ltd., 5 pages (date unknown).

Brochure for "Perfect Universal Slot Machines," Universal Co., Ltd., 16 pages (date unknown).

Brochure for "The 50$^{th}$ Show," Ate International, 2 pages (Jan. 1994).

Brochure for "World Players," Barcrest, 6 pages (date unknown).

Chapters 10, 11 & 12, excerpts from "Lemons, Cherries and Bell-Fruit-Gum," Richard M. Bueschel, 71 pages (1995).

Cover page for "Covers Your World," *Euroslot. The Currency of the Coin Machine Industry*, 1 page (date unknown).

Cover page, "Enter Disposable Gaming," *Euroslot. The International Coin-Operated Machine Journal*, 1 page (Apr. 1994).

(56) References Cited

OTHER PUBLICATIONS

Las Vegas Slot Machine Advertisement for excerpt from "Lemons, Cherries and Bell Fruit Gum," Richard M. Bueschel, 1 page (date unknown).
PCT International Search Report for International Application No. PCT/US2005/023372 dated Nov. 14, 2005 (2 pages).
Product Sheet for "Batter Up!," Williams Gaming, Inc. (date unknown).
Product Sheet for "Big Money," WMS Gaming Inc., 1 page (date unknown).
Product Sheet for "Double Wild & Loose," Williams Electronics Games, Inc., 3 pages (date unknown).
Product Sheet for "Double Wild Cherry (195A)," International Game Technology, 3 pages (Nov. 7, 1994).
Product Sheet for "Kaleidoscope," Williams Electronics Games, Inc., 3 pages (date unknown).
Product Sheet for "Monopoly SWP," JPM Ltd., 4 pages (date unknown).
Product Sheet for "Piggy Bankin'," WMS Gaming Inc., 1 page (date unknown).
Product Sheet for "Pirate's Thunder," WMS Gaming Inc., 1 page (date unknown).
Product Sheet for "Wild Cherry (120A)," International Game Technology, 2 pages (Nov. 7, 1994).
Website Publication for "Arabian Riches," Silicon Gaming Inc., 2 pages (Jul. 17, 1998).
Website Publication for "Buccaneer Gold," Silicon Gaming Inc., 2 pages (Jul. 17, 1998).
Website Publication for "Fort Knox," Silicon Gaming Inc., 2 pages (Jul. 17, 1998).
Website Publication for "Lady of Fortune," Silicon Gaming Inc., 2 pages (Jul. 17, 1998).
Website Publication for "Phantom Haus," Williams Electronics Games, Inc., 2 pages (date unknown).
Website Publication for "Riddle of the Sphinx," Silicon Gaming Inc., 2 pages (Jul. 17, 1998).

* cited by examiner

SYSTEM AND METHOD FOR SAVING STATUS OF PAUSED GAME OF CHANCE

REFERENCE TO RELATED APPLICATIONS

This application is a continuation of U.S. patent application Ser. No. 11/519,463, filed Sep. 12, 2006, issued as U.S. Pat. No. 7,811,167 on Oct. 12, 2010, which is a continuation of U.S. patent application Ser. No. 10/854,352, filed May 26, 2004, issued as U.S. Pat. No. 7,182,690 on Feb. 27, 2007; which is a continuation of U.S. patent application Ser. No. 09/891,010, filed Jun. 25, 2001, issued as U.S. Pat. No. 6,800, 027 on Oct. 5, 2004; which is a continuation-in-part of U.S. patent application Ser. No. 09/538,934, filed Mar. 31, 2000, issued as U.S. Pat. No. 6,592,457 on Jul. 15, 2003, which is a continuation-in-part of U.S. patent application Ser. No. 09/318,903, filed May 26, 1999, now issued as U.S. Pat. No. 6,443,837, and U.S. patent application Ser. No. 09/393,492, filed Sep. 10, 1999, now issued as U.S. Pat. No. 6,270,411. Priority is claimed from all these applications. All of these applications are incorporated by reference.

FIELD OF THE INVENTION

The present invention relates generally to games of chance and, more particularly, to a system and method for storing the status of a paused game of chance at a central database linked to and remote from a gaming machine.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operators. Traditional gaming machines use mechanical slot reels or video depictions of such reels to display games and outcomes to players. Further, many traditional gaming machines use simulations of standard casino games such as cards, dice, bingo and the like to attract players. These traditional machines may become repetitive over time, and it is believed that more innovative displays and gameplay features will find success by offering players an interesting and exciting alternative to traditional games. Accordingly, in the competitive gaming machine industry, there is a continuing need for gaming machine manufacturers to produce new types of games, or enhancements to existing games, which will attract frequent play by enhancing the entertainment value and excitement associated with the game. In particular, there is a need for engaging and entertaining games that can hold a player's interest more than existing games. The present invention is directed to satisfying this need.

SUMMARY OF THE INVENTION

In accordance with one aspect of the present invention, a game of chance involving a progression of events is conducted on one or more gaming machines. After receiving a wager from a player at a gaming machine, play of the game is initiated. If the game is paused, the status of the paused game is stored at a central database linked to and remote from the gaming machine. This game status is associated with a personal identifier of the player. To continue play of the game beginning from a point at which the game was paused, the personal identifier is provided to the central database via the same or another gaming machine and the game status associated with the personal identifier is retrieved from the central database.

BRIEF DESCRIPTION OF THE DRAWINGS

The foregoing and other advantages of the invention will become apparent upon reading the following detailed description and upon reference to the drawings in which.

Figure 1:
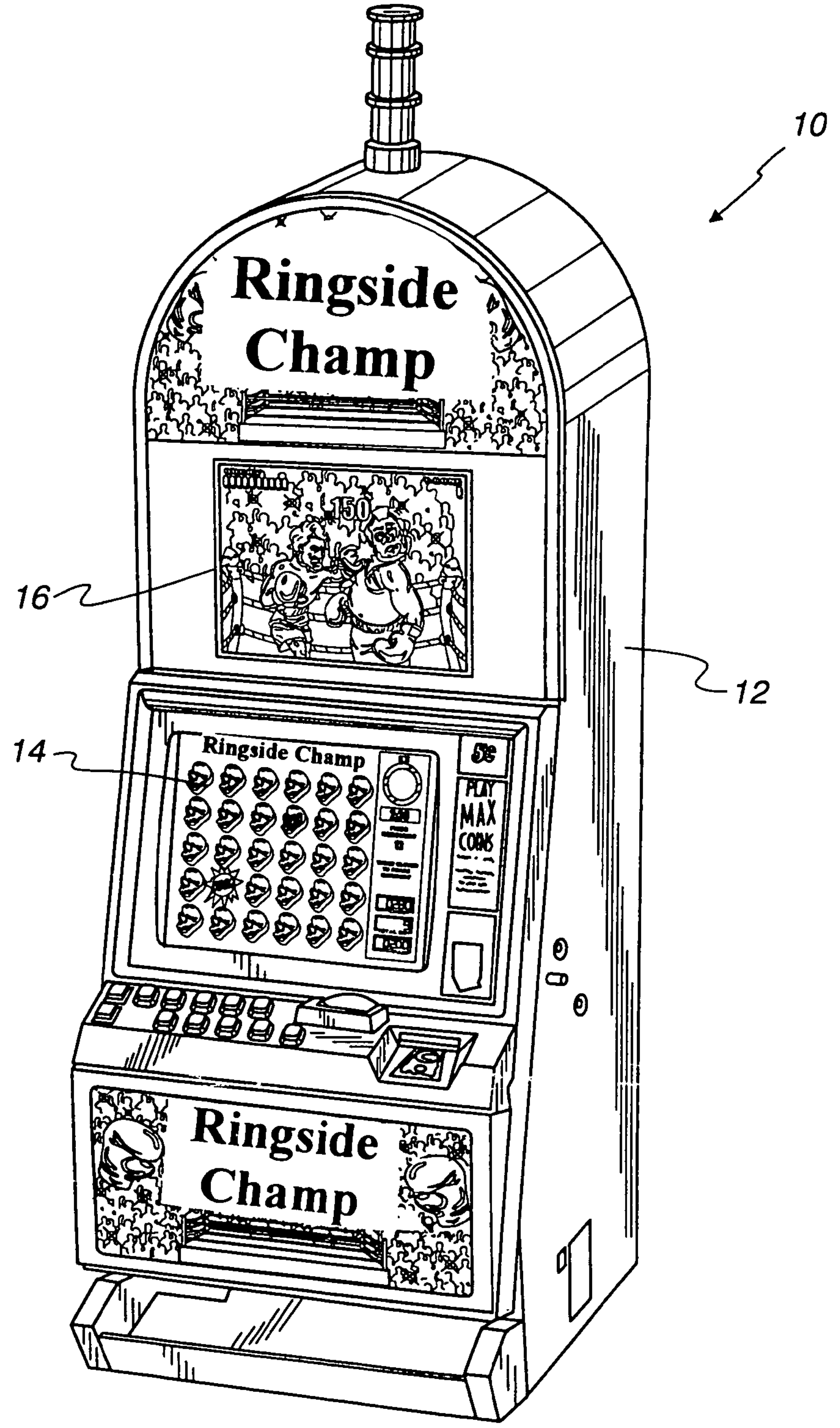
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a video gaming machine 10 that may be used to implement a game according to the present invention. The gaming machine 10 includes a large bonnet-top cabinet 12 containing two video displays 14 and 16. Each of the video displays 14 and 16 may comprise a dot matrix, CRT, LED, LCD, electro-luminescent display or generally any type of video displays known in the art. One or both of the video displays 14 and 16 may incorporate a touch-screen input device. In the illustrated embodiment, the gaming machine 10 is an "upright" version in which the video displays 14 and 16 are oriented vertically relative to the player. It will be appreciated, however, that any of several other models of gaming machines are within the scope of the present invention including, for example, a single video display and more than two video displays. Furthermore, a "slant-top" version containing the video display(s) that is slanted at about a thirty-degree angle toward the player may be used.

In one embodiment, the gaming machine 10 is operable to play a game entitled RINGSIDE CHAMP™ having a boxing theme. In another embodiment, the gaming machine 10 is operable to play a game having a football theme. In alternative embodiments, the gaming machine 10 may provide different games and/or any of several alternative game themes. The RINGSIDE CHAMP™ game features a basic game with player selected events in the form of a boxing match (see FIGS. 3*a* and 3*b*). The RINGSIDE CHAMP™ game may also include a bonus game or secondary game.

Figure 2:
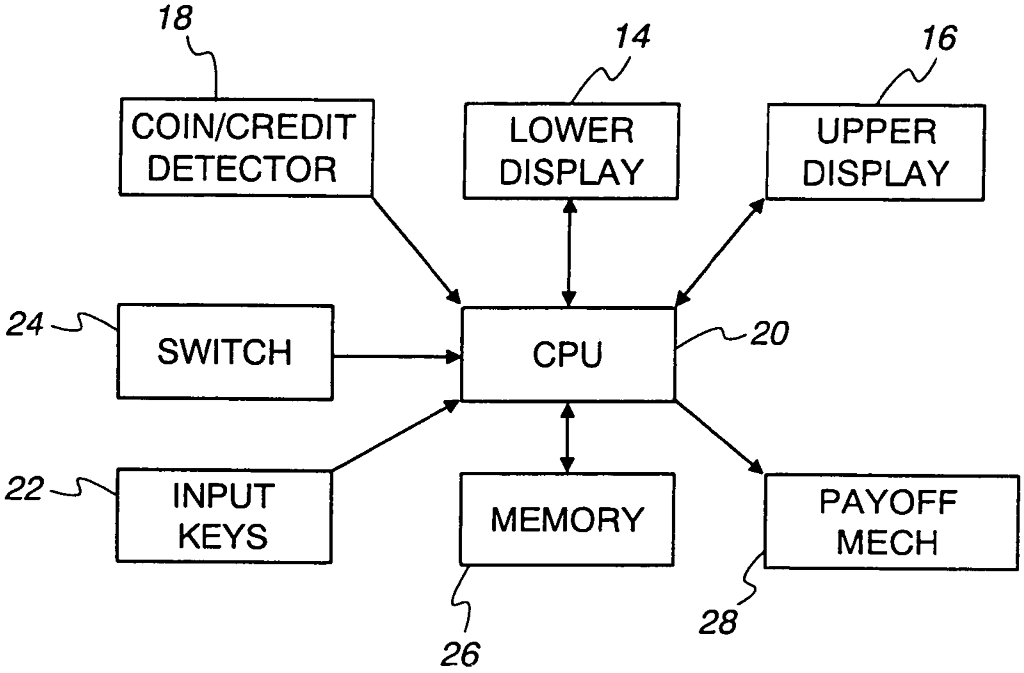
FIG. 2 is a block diagram of a control system suitable for operating the gaming machine in FIG. 1.

FIG. 2 is a block diagram of a control system including processing circuitry suitable for operating the gaming machine 10. Coin/credit detector 18 signals a CPU 20 when a player has inserted a number of coins or played a number of credits. Then, the CPU 20 operates to execute a game program which causes the lower video display 14 to display the basic game that includes a series of player selectable options displayed thereon (see FIGS. 3*b* and 4*b*). The player may select the amount to wager via an input key 22. A play of the game commences in response to the player activating a switch 24 corresponding to a displayed option (e.g., by pushing a button or touching a touch screen), causing the CPU 20 to randomly select a game outcome and animate the game outcome on the upper display 16. Animation may take any of several forms; for example, the animation may be hand-drawn animation showing an action, computer animated action, video or film representations, or any other visible movement corresponding to a selected option. In one embodiment, the game outcome may be displayed via mechanical devices which carry out an action in response to the player's selection of an option. In addition, the depiction of the outcome of an option selected by a player may be displayed using a combination of these forms of animation. In one embodiment, certain of the basic game outcomes cause the CPU 20 to enter a bonus mode causing the video displays 14 and 16 to show a bonus game.

A system memory 26 stores control software, operational instructions and data associated with the gaming machine 10. In one embodiment, the memory 26 comprises a separate read-only memory (ROM) and battery-backed random-access memory (RAM). However, it will be appreciated that the system memory 26 may be implemented on any of several alternative types of memory structures or may be implemented on a single memory structure. A payoff mechanism 28 is operable in response to instructions from the CPU 20 to award a payoff of coins or credits to the player in response to certain winning situations which might occur in the game. The payoff amounts corresponding to certain outcomes in the basic game are predetermined according to a pay table stored in system memory 26. The payoff amounts corresponding to certain outcomes of the bonus game are also stored in system memory 26. Furthermore, the system memory 26 stores data relating to the images to be shown on the lower and upper displays 14 and 16.

Figure 3A:
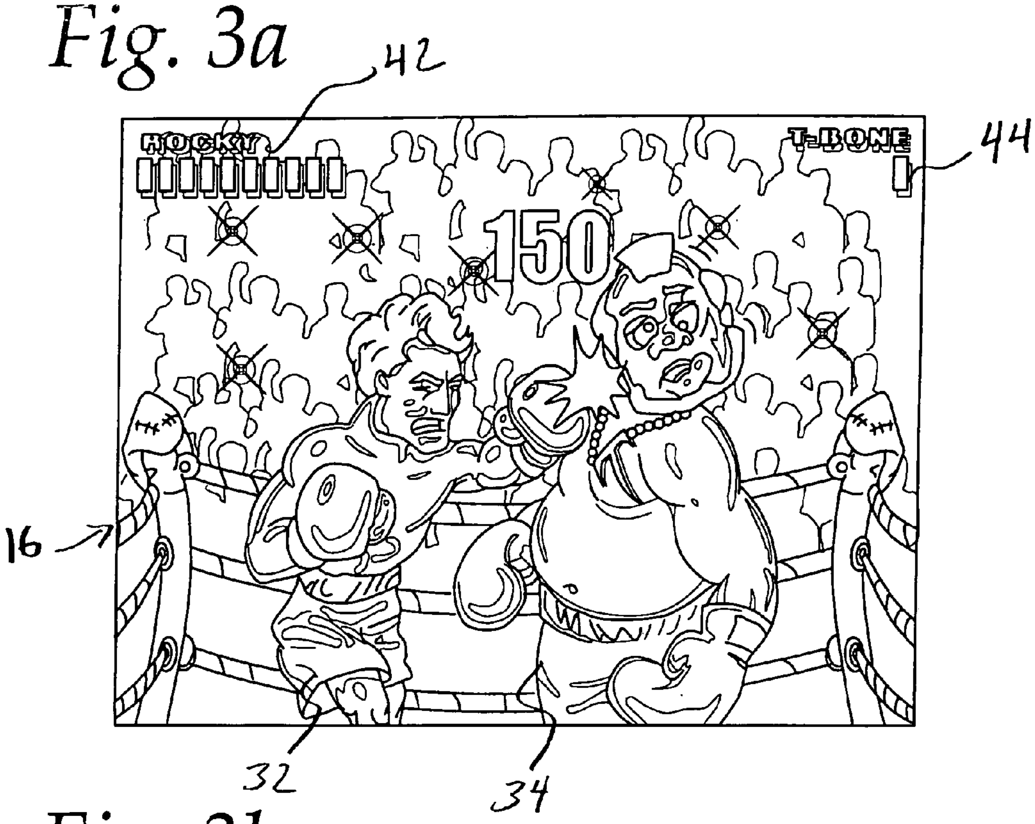
FIGS. 3*a* and 3*b* are display screen captures associated with a boxing game that is played on the gaming machine in FIG. 1.
Figure 3B:
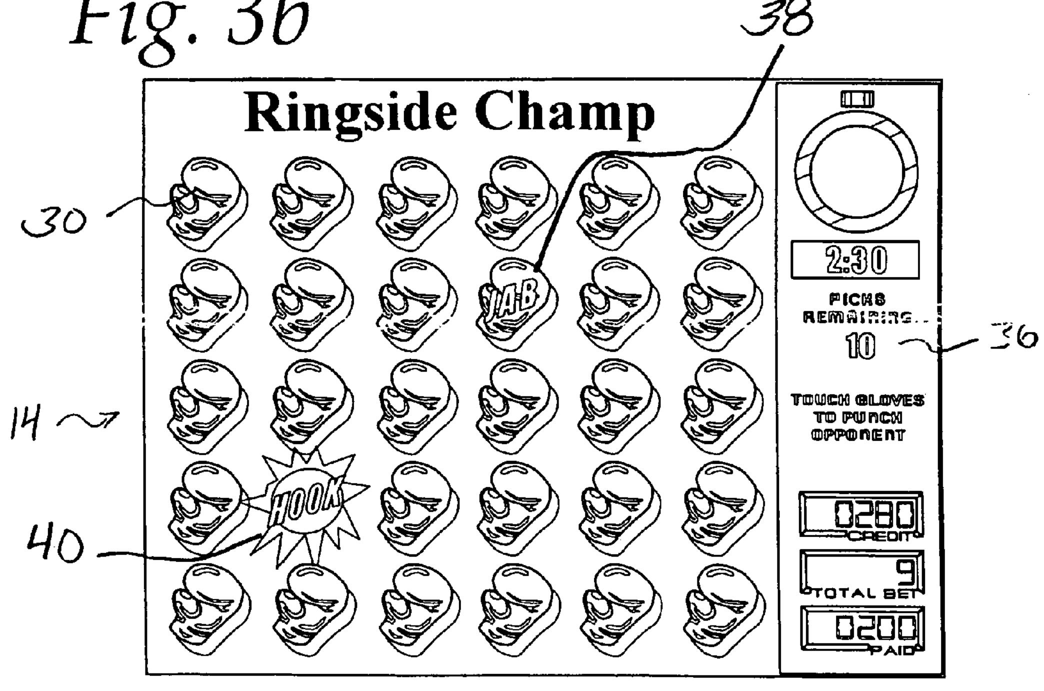

As shown in FIGS. 3*a* and 3*b*, the RINGSIDE CHAMP™ basic game is implemented on the video displays 14 and 16. As illustrated in FIG. 3*b*, the lower display 14 presents an array of boxing gloves 30. As illustrated in FIG. 3*a*, the upper display presents an animation of a boxing match with two boxers "Rocky" 32 and "T-Bone" 34. Generally, game play is initiated by inserting a number of coins or playing a number of credits, causing the CPU 20 (FIG. 2) to activate a number of picks available to the player corresponding to the number of coins or credits played. The lower display 14 illustrates the number of picks 36 or selections available to the player.

After picks 36 are made available to the player, the lower display 14 informs the player "TOUCH GLOVES TO PUNCH OPPONENT." The CPU 20 uses a random number generator (not shown) to select a punch type for each of the displayed gloves 30. In one embodiment, the punch type for each glove 30 is written over the gloves 30 as shown by the "JAB" glove 38. For convenience, this embodiment is called the options revealed embodiment. In another embodiment, a punch type or outcome for each glove is not revealed until the player selects a glove such as the revealed "HOOK" glove 40. For convenience, this embodiment is called the options hidden embodiment. For both the options revealed and options hidden embodiments, the player selects one of the boxing gloves 30. In one embodiment, the lower display 14 includes a touch screen to allow the player to press the desired boxing glove 30.

In the options revealed embodiment, once the player selects one of the boxing gloves 36, the selected option animates on the upper display 16. For the example illustrated in FIGS. 3*a* and 3*b*, the JAB option 38 has been selected and ROCKY throws a jab punch. The CPU 20 randomly determines a punch outcome for the selected JAB option 38. The punch outcome is a result for the thrown punch having a payoff, such as a missed punch equaling no payoff, a blocked punch equaling no payoff, a soft hit equaling 10 credits, a medium hit equaling 50 credits, a solid hit equaling 150 credits, a knock down equaling 250 credits and a knock out equaling 500 credits. For example, the JAB punch may result in the solid hit as animated on the upper display 16 in FIG. 3*a* with the JAB punch connecting with the face of T-Bone resulting in a 150 credit payoff to the player. Table 1 illustrates a pay table for the RINGSIDE CHAMP™ basic game. In the options revealed embodiment, the punches are shown to the player before the player's selection, but the outcomes of the punches are randomly determined following the player's selection.

TABLE 1

Pay Table for Options Revealed Embodiment

| PUNCH OUTCOME | PAYOFF |
|---|---|
| MISSED PUNCH | 0 |
| DEFLECTED PUNCH | 0 |
| SOFT HIT | 10 |
| MEDIUM HIT | 50 |
| SOLID HIT | 150 |
| KNOCK DOWN | 250 |
| KNOCK OUT | 500 |

The options hidden embodiment is similar to the options revealed embodiment. Once the player selects one of the boxing gloves 36, the selected boxing glove animates on the lower display 14 revealing either a punch type, such as HOOK 40 in FIG. 3*b*, or an outcome for the selected boxing glove. If a punch type is revealed, the CPU 20 determines a punch outcome for the revealed punch type, such as the HOOK punch 40. The punch outcome is a result for the thrown punch having a payoff value, such as a missed punch equaling no payoff, a deflected punch equaling no payoff, a soft hit equaling a small payoff, a medium hit equaling a medium payoff, or a solid hit equaling a large payoff. For example, the HOOK punch may result in the solid hit as animated on the upper display 16 in FIG. 3*a* for the JAB punch resulting in a 150 credit payoff to the player. In the options hidden embodiment, the punches or outcomes corresponding to the boxing gloves may be randomly determined before the player selects a boxing glove 30. Alternatively, the punches or outcomes corresponding to the boxing gloves may be randomly determined after the player selects a boxing glove 30. In one embodiment, all of the hidden punches, defensive moves, and/or punch outcomes may be displayed after the player selects one of the boxing gloves.

For both the options revealed embodiment and the options hidden embodiment, the upper display 16 presents a score card 42 for ROCKY and a score card 44 for T-BONE. In one embodiment, the score cards 42 and 44 track and illustrate the punch outcomes for the player. In another embodiment, the score cards reflect the energy or power remaining for the player and the opponent. In this embodiment, the game may pause when ROCKY's score card 42 is depleted to zero to allow the player to place a new wager and increase ROCKY's score card. Further, in this embodiment some boxing gloves may be associated with block or dodge moves that allow the player to avoid getting hit and losing energy or power. Using this embodiment, the player may decide whether to play offensively or defensively to arrive at the best outcome. Following the player's selection of a boxing glove and the machine's depiction of the outcome, the boxing match illustrated on the upper display 16 continues allowing the player to select another boxing glove 30. The punch outcome of the selected boxing gloves 30 is reflected on the score cards 42 and 44. Thus, the boxing match becomes a continuing gameplay experience in which the player participates. As the gameplay experience continues, a connecting punch may result in a knockdown or a knockout, in which case bonus payoffs may be rewarded in addition to the payoffs for connecting punches.

In one embodiment of the RINGSIDE CHAMP™ game, the player can be given the option to place wagers on multiple events or achievements within the boxing game. For example, a player may place bets on who will win the bout, the outcome of the bout (for example, a knockout, a TKO, or a decision), the number of punches that are thrown or that land in a bout, and the like. These wagers may be placed at the beginning of the RINGSIDE CHAMP™ game or after the game has begun.

Figure 5:
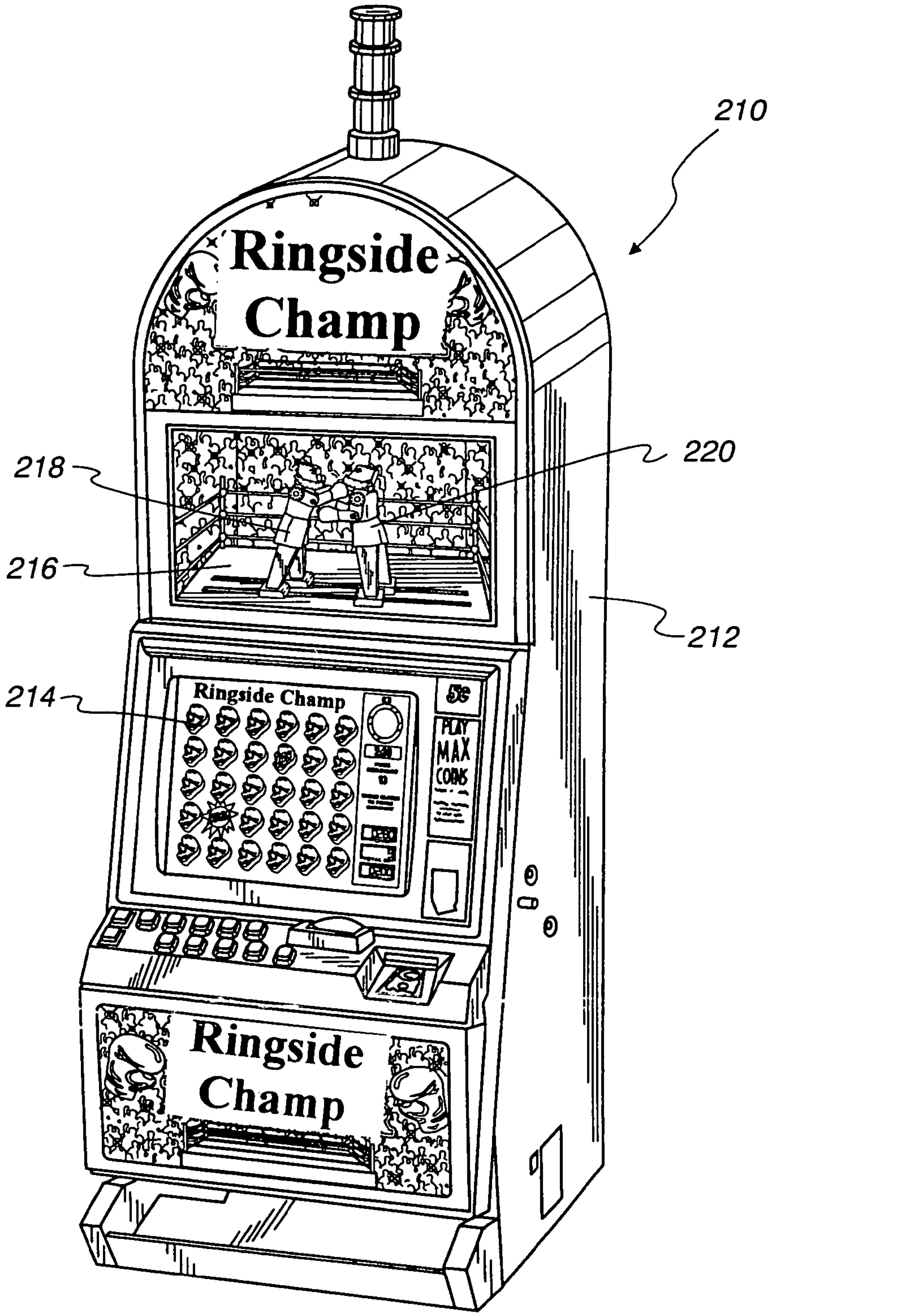
FIG. 5 is a perspective view of a gaming machine for playing one embodiment of the present invention.

Further, in addition to being shown on an upper display 16, the outcomes of selections by a player and the progression of the present invention may be shown via mechanical devices as illustrated in FIG. 5. In this embodiment the gaming machine 210 has a stand-up cabinet 212 with a lower display 214 and an upper mechanical display 216. In the RINGSIDE CHAMP™ embodiment, a mechanical actor representing the player 218 and a mechanical actor representing the opponent 220 provide a physical representation of the outcomes and progression of the game as selected by the player. The mechanical display could further be used in other embodiments, where the mechanical display may depict vehicles, teams, or other objects.

Figure 4A:
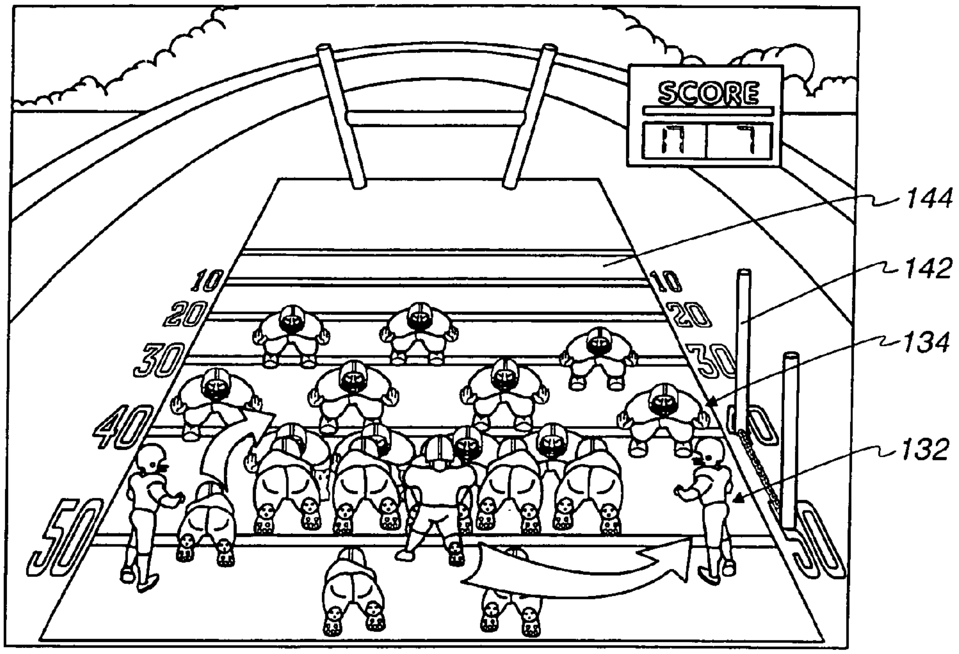
FIGS. 4*a* and 4*b* are display screen captures associated with a football game that is played on the gaming machine in FIG. 1.
Figure 4B:
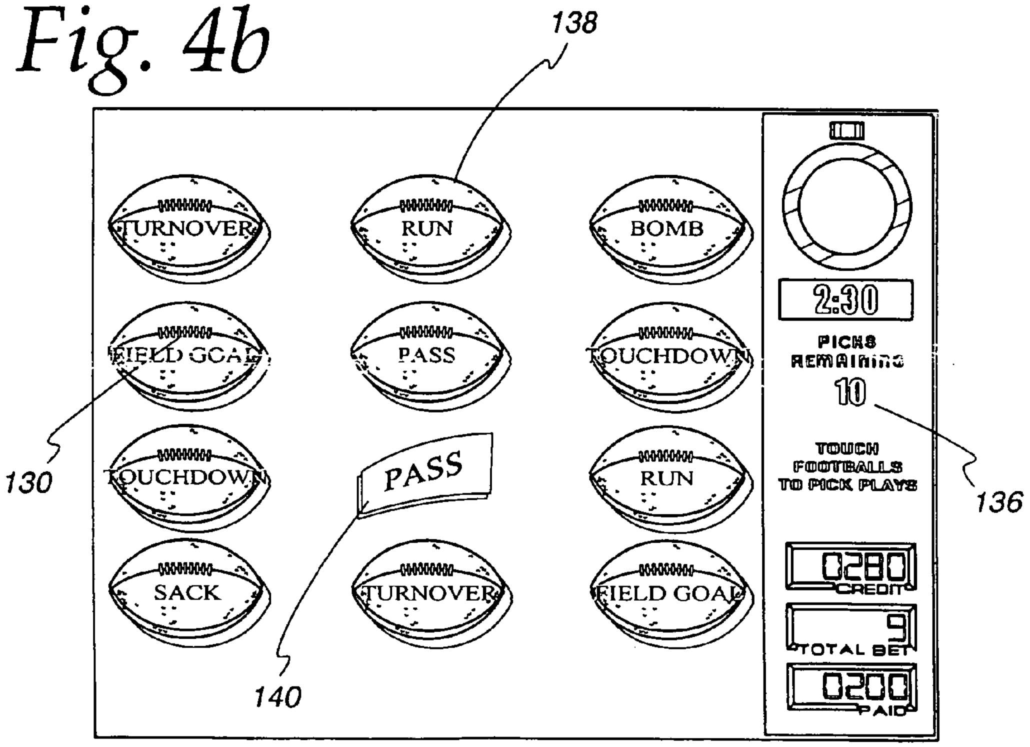

In another embodiment, the gaming machine 10 is operable to play a game entitled "football" having an American football theme. As shown in FIGS. 4*a* and 4*b*, the football basic game is similarly implemented on the video displays 14 and 16 as the RINGSIDE CHAMP™ game. As illustrated in FIG. 4*b*, the lower display 14 presents an array of footballs 130. As illustrated in FIG. 4*a*, the upper display presents an animation of a football game with two teams "Home" 132 and "Visitor" 134. Generally, game play is initiated by inserting a number of coins or playing a number of credits, causing the CPU 20 (FIG. 2) to activate a number of picks available to the player corresponding to the number of coins or credits played. The lower display 14 illustrates the number of picks 136 or selections available to the player.

After picks 136 are made available to the player, the lower display 114 informs the player "TOUCH FOOTBALLS TO PICK PLAYS." The CPU 20 uses a random number generator (not shown) to select a play type for each of the displayed footballs 130. In one embodiment, the play type for each football 130 is written over the football 130 as shown by the "RUN" football 138. For convenience, this embodiment is called the options revealed embodiment. In another embodiment, the play type or outcome for each football is not revealed until the player selects that football such as the revealed "PASS" football 140. For convenience, this embodiment is called the options hidden embodiment. For both the options revealed and options hidden embodiments, the player selects one of the footballs 130. In one embodiment, the lower display 14 is a touch screen to allow the player to press the desired football 130.

In the options revealed embodiment, once the player selects one of the footballs 130, the selected option animates on the upper display 16. For the example illustrated in FIGS. 4*a* and 4*b*, the RUN option 138 has been selected and the HOME team executes a run play. The CPU 20 randomly determines a play outcome for the selected RUN option 138. The play outcome is a result for the executed play having a payoff value, such as a loss of yardage equaling no payoff, no gain equaling no payoff, short gain equaling a small payoff, a long gain equaling a medium payoff, and a touchdown equaling a large payoff. For example, the RUN play may result in the short gain as animated on the upper display 16 in FIG. 4*a* providing a 10 credit payoff to the player. Table 2 illustrates a pay table for the football basic game.

TABLE 2

Pay Table for Options Revealed Embodiment

| PLAY OUTCOME | PAYOFF |
|---|---|
| LOSS OF YARDAGE | 0 |
| NO GAIN | 0 |
| SHORT GAIN | 10 |
| MEDIUM GAIN | 50 |
| LONG GAIN | 150 |
| FIELD GOAL | 250 |
| TOUCHDOWN | 500 |

The options hidden embodiment is similar to the options revealed embodiment. Once the player selects one of the footballs 130, the selected football animates on the lower display 14 revealing the play or play outcome, such as PASS 140 in FIG. 4*b*. In the options hidden embodiment, the plays or play outcomes may be randomly determined by the CPU 20 either before the player selects a football 130 or after the player selects a football 130. In the current example, the CPU 20 randomly determines a play outcome for the selected PASS option 140. Alternatively, in the options hidden embodiment, the CPU 20 could randomly choose a play outcome such as "TOUCHDOWN" to correspond to a football 130. The play outcome is a result for the executed play having a payoff value, such as a loss of yardage equaling no payoff, no gain equaling no payoff, short gain equaling small payoff, a long gain equaling a medium payoff, and a touchdown equaling a large payoff. For example, the PASS play may result in the long gain resulting in a 150 credit payoff to the player. In one embodiment, all of the hidden plays and/or play outcomes may be displayed after the player selects one of the footballs.

For both the options revealed embodiment and the options hidden embodiment, the upper display 16 presents a first down marker 142 for the HOME team. The first down marker 142 tracks and illustrates the yardage gained by the play outcomes for the player. The football game illustrated on the upper display 16 continues allowing the player to select another football 130. The play outcome of the later selected footballs 130 is illustrated as progress with respect to the first down marker 142 and the end zone line 144. Progress may also be shown by a scoreboard 146 on the upper display 16. Although not shown in the pay table, payoffs may also be awarded for field goals, kickoff returns, punt returns, and other types of football plays. In one embodiment, the football game continues after the player scores, so that the player plays on defense rather than offense. In this embodiment, the footballs 130 show defensive play types when the player is on defense, and the player may receive payoffs for successful defensive plays or for stopping the opposing team from scoring or advancing the ball.

In one embodiment, the footballs 130 initially correspond to football formations. In this embodiment, when a player selects a formation the footballs 130 alter so that they correspond to individual plays using the selected formation. This embodiment may be employed with either offensive or defensive plays. Further, schematic diagrams of a play choice may be displayed.

In addition to the RINGSIDE CHAMP™ and football games described above, the present invention may be implemented in connection with a wide variety of a lifelike representations of other sports, such as, for example, baseball, hockey, basketball, soccer, tennis, automobile or horse racing, golf, track-and-field, or bowling events. In all embodiments, the game selected is other than slots, cards, roulette, dice, dominoes, bingo, or keno. In one embodiment, in addition to the wager and play features described above, the player may place optional wagers on overall outcomes of a continuing gameplay experience. For example, in the RINGSIDE CHAMP™ game, a player may be able to wager on such outcomes as who will win a bout, how many punches each competitor with throw or land, and the overall number of rounds in the bout. Likewise, in the football game, a player may be able to wager on such outcomes as the winner of the game, the margin of victory, the points scored by each team or the teams combined, the overall yardage gained or lost by each team, pass completion percentage, and other such statistics.

Optional wagers may be placed at the same time as the wagers that start the game, or they may be placed during the game so as to alter the possible payoffs resulting from the outcomes. Different wagers may be accepted based on the complexity of the game desired by the player; if a player desires a very complex game with many statistics to wager on, many different optional wagers may be accepted. Alternatively, a player may wish only to play a simple play with no wagers other than the basic wagers used to play the game, and therefore the game will be limited to accepting less complex wagers.

In one embodiment of the present invention, a large jackpot may be provided to players who achieve an especially rare accomplishment in the game. For example, in the RINGSIDE CHAMP™ game, a large jackpot can be awarded if the player achieves a first-round knockout. Similarly, in the football game, a large jackpot can be awarded if the player scores an unusually high point total or if the player keeps the opposing team from scoring any points.

Figure 6:
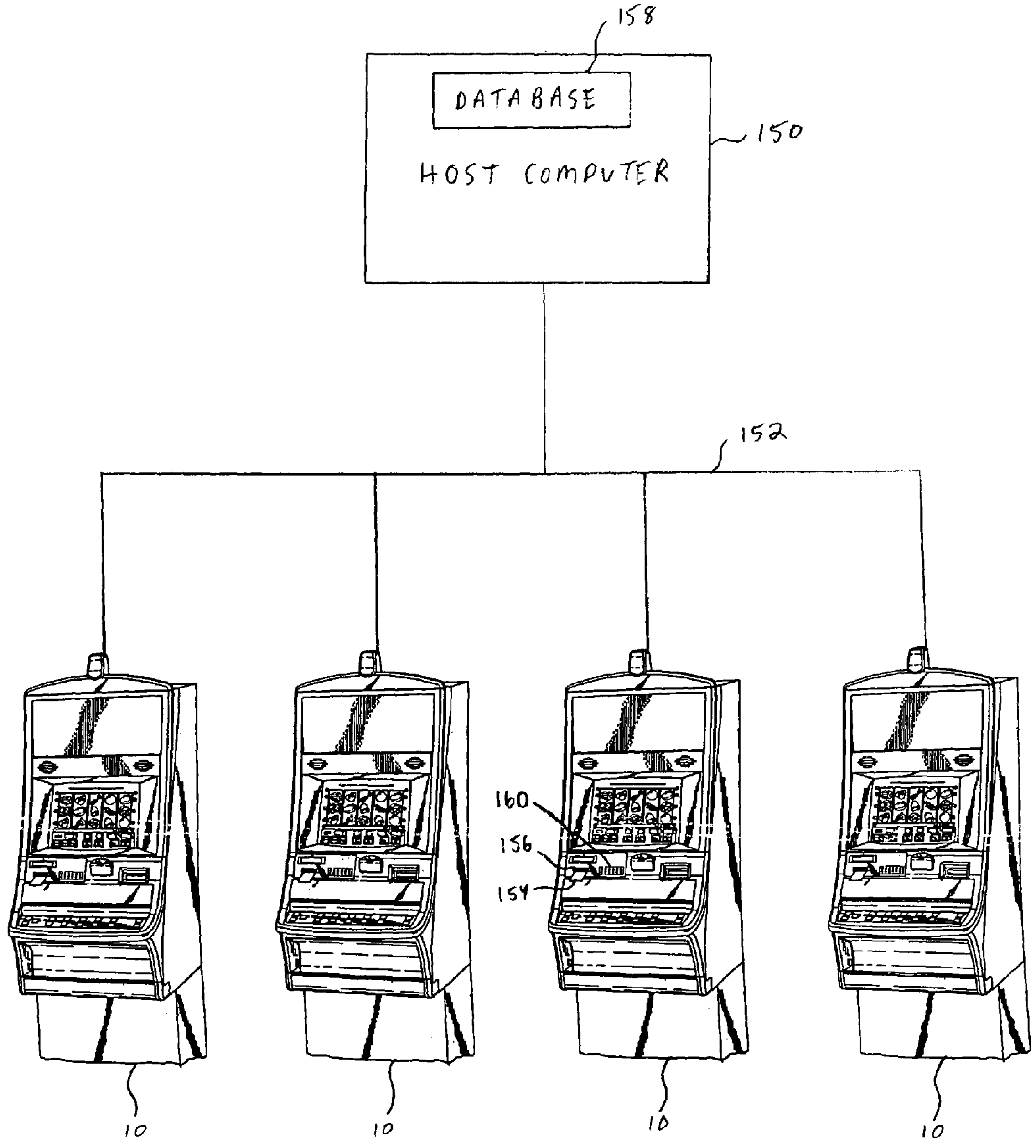
FIG. 6 is a schematic diagram of a system for linking multiple gaming machines to a central host computer.

In another embodiment of the present invention, a player may pause a game before the conclusion of the game. Toward that end, referring to FIG. 6, the gaming machine 10 may be linked along with other gaming machines 10 to a "back-end" central host computer 150 via a high-speed local or wide area computer network 152. The computer network 152 may employ a data transfer protocol such as 100 Base-T Ethernet or Gigabit Ethernet, which support data transfer rates of 100 megabits per second and 1 gigabit per second, respectively. Alternatively, the gaming machines 10 and the host computer 150 may each be outfitted with transceivers that support two-way wireless communication. Each gaming machine 10 is assigned a respective permanent identification number (PIN) for identifying the machine 10 to the host computer 150 and allowing the host computer 150 to address the machine 10.

The central computer 150 may be used to extract accounting data from the individual gaming machines 10 as well as provide player tracking. An example of a data collection system is described in U.S. Pat. No. 4,283,709 issued to Lucero et al. Network systems such as described in Lucero et al. allow the host computer 150 to monitor the usage and payout, collectively known as audit data, of the individual gaming machines 10. This audit data includes data related to the number of coins or tokens inserted into the machine, the number of times the machine has been played, the amount paid in raises, the number and the type of jackpots paid by the machine, the number of door openings, etc. The host computer 150 can then compile an accounting report based on the audit data from each of the individual gaming machines 10. This report can then be used by management, for example, to assess the profitability of the individual gaming machines 10.

Player tracking, as the name indicates, involves tracking individual player usage of the gaming machines 10. In a typical player tracking system, the player is issued a player identification card 154 which has encoded thereon a player identifier such as a personal identification number or code that uniquely identifies the player. The player identification card 154 may be in the form of a smart card, magnetic card, or other memory device and may also be used for cashless gaming. If the card 154 is used for cashless gaming, funds may be stored directly on the card or in a database at the host computer 150. The individual gaming machines 10 are each fitted with a respective card reader 156 into which the player inserts a player tracking card 154 prior to playing the associated gaming machine 10. The card reader 156 reads the personal identifier off the card 154 and informs the host computer 150 linked thereto of the player's subsequent gaming activity. The host computer 150 preferably includes a database 158 containing a personal record associated with the player's personal identifier. The personal identifier on the card 154 is used to address and retrieve this personal record. By tracking the individual players, individual player usage can be monitored by associating certain of the audit data with the players' personal identifiers. This allows gaming establishments to target individual players with direct marketing techniques according to the individual's usage.

In addition to being used for player tracking and cashless gaming, the player identification card 154 may be used to save/record the status of a game involving a continuing performance or progression of events when the player chooses to pause the game. The game may be paused at any time the player wishes. When paused, the status of the game is preferably saved in the player's personal record in the database 158 at the host computer 150. Then, when the player wants to resume the game, the player may input the player identification card 154 into any of the gaming machines 10 that execute that game. The gaming machine then addresses the personal database record associated with the personal identifier on the card 154, retrieves the last status of the paused game, and configures itself to initiate play of the game from the point at which the game was paused.

Instead of identifying a player to the host computer 150 using a personal identifier on the player identification card 154, the player may be identified by biometrics (e.g., fingerprint, eye scan, etc.) or by a personal identifier manually entered via a keypad 160 or touch screen at the gaming machine 10.

Thus, the player may play an entire football game or boxing match, for example, without having to stay at the machine the entire time, and without having to return to the same machine in the future to conclude the game. This embodiment could further be used, for example, for a player to simulate a season in football, baseball, or any other team sport or a career in boxing, tennis, or any other individual sport. Further, in sports such as horse racing and auto racing, this embodiment could be used to allow the player to build up a stable of horses or a team of automobiles that would be managed over time by the player. Thus, in addition to the payoffs granted by the machine, the player may build up status on the game over time, and these status improvements may be used by casino operators to grant special bonuses.

Furthermore, the saved status of first game may be loaded into the same game or, if certain predetermined requirements are met, into a second game such as a sequel to the first game. For example, if a player fulfilled the game requirements on a first game and saved the status of the "completed" first game at the central database, the saved game status may be loaded into the second game. Loading the saved game status into the second game may, for example, unlock secret features of the second game. Secret features may include bonus rounds, characters, reel symbols, special effects, and other game play elements that are not ordinarily available to a player but are made available if the player saves and loads the status of the "completed" first game into the second game. Thus, the player is motivated to play the first game until fulfilling all of its requirements so that the player can unlock and take advantage of the secret features of the second game.

While the present invention has been described with reference to one or more particular embodiments, those skilled in the art will recognize that many changes may be made thereto without departing from the spirit and scope of the present invention. For example, the basic game may itself be implemented on the video display 12 or on a separate video display. Further, though the present invention has been described as an entire game, those skilled in the art will recognize that the invention could also be implemented as a bonus game for known types of gaming machines. In addition, though the present invention has been described with respect to the portrayal of simulated sporting events, the invention is not limited to portraying simulated sporting events and includes the portrayal of other types of events and actions. Further, though specific embodiments have been described having two displays, the invention may be implemented on machines having only one display and may also be implemented on machines having more than two displays. Each of these embodiments and obvious variations thereof is contemplated as falling within the spirit and scope of the claimed invention, which is set forth in the following claims.

What is claimed is:

1. A gaming machine comprising:

an interface coupling the gaming machine to a network, the network including a central database and a plurality of gaming machines, the central database being remote from the gaming machine, the central database including a plurality of personal records, each of the personal records including status information of a paused wagering game corresponding to player identification information;

a player information input device to receive player identification information from a player;

a wager input device to receive a wager from the player;

a wagering game including a progression of evolving events in a continuing game play experience, at least one of the events being dependent on a prior event in the progression of evolving events and including a graphical depiction of a non-numerical object, the interface retrieving the status information of a paused state of a wagering game from the personal record in the central database corresponding to the received player identification information, and wherein the wagering game continues play from a point of the paused state of the wagering game based on the received status information of the wagering game.

2. The gaming machine of claim 1, wherein the gaming machine is coupled to the central database through a wireless communication network.

3. The gaming machine of claim 1, wherein the gaming machine is coupled to the central database through a wide-area communication network.

4. The gaming machine of claim 1, wherein the player information input device is a card reader and the player identification information is received via a player card.

5. The gaming machine of claim 4, wherein the player card includes monetary information allowing for cashless gaming.

6. The gaming machine of claim 5, wherein the monetary information identifies a fund source located remotely from the gaming machine, and the wager input device accesses the fund source.

7. The gaming machine of claim 1, wherein the identification information includes a personal identifier of the player.

8. The gaming machine of claim 1, wherein the network is a casino player-tracking network for monitoring the wagering-game usage associated with the player.

9. The gaming machine of claim 1, wherein the non-numerical object is moving.

10. The gaming machine of claim 1, further comprising a second wagering game having at least one feature associated with completed game information, wherein on completion of the wagering game, the interface causes the central database to update the personal record to include completed game information, and wherein the gaming machine receives a second wager from the player, the interface retrieving the completed game information from the central database corresponding to the received player identification information, and wherein the second wagering game offers the at least one feature associated with the completed wagering game to the player.

11. A wagering game system, comprising:

a first gaming machine having:

a wager input device to receive a wager from a player, a wagering game including a progression of evolving events in a continuing game play experience, wherein at least one event is dependent on at least one prior event in the progression of evolving events and including a graphical depiction of a non-numerical object, a first network interface, a first player identification input device to receive identification information from the player, and wherein first gaming machine receives a wager from a player via the first wager input device and player identification information via the first player identification input device, initiates the wagering game, pauses the wagering game at a paused state within the progression of evolving events and generates game status information corresponding to the paused state within the progression of evolving events of the wagering game;

a second gaming machine having:

a second wager input device to receive a wager from the player, a wagering game identical to the wagering game of the first gaming machine, a second player identification input device, and a second network interface;

a network coupled to the first and second gaming machines;

a central database remote from and coupled to the first and second gaming machines via the network, the central database including a record having game status information corresponding to the player identification information; and wherein the first or second gaming machine receives a second wager from the player after the pausing of the wagering game at the first gaming machine, the first player identification input device or the second player identification input device receiving player identification information from the player, the first or second gaming machine further retrieving the status information of the paused state of the wagering game from the central database and continuing play of the wagering game beginning from a point of the paused state of the wagering game.

12. The game system of claim 11, wherein the first and second gaming machines are coupled to the central database through a wireless communication network.

13. The game system of claim 11, wherein the first and second gaming machines are coupled to the central database through a wide-area communication network.

14. The game system of claim 11, wherein the network is a casino player-tracking network for monitoring the wagering-game usage associated with the player.

15. The game system of claim 11 wherein the first player identification input device receives the player identification information by a card, a keypad, a touch screen, or a biometric measurement.

16. The game system of claim 11, wherein the non-numerical object is moving.

17. A method for playing a wagering game, comprising:

receiving a wager input from a player for playing a wagering game on a first gaming machine;

presenting a progression of evolving player initiated events in a continuing game play experience, wherein each player initiated event is dependent on at least one prior event in the progression of evolving player initiated events;

storing game information representing a saved status of the wagering game including the at least one player initiated event;

pausing the wagering game after storing the game information;

receiving a second wager input from the player on a second gaming machine;

presenting on a second gaming machine the wagering game based on the stored gaming information; and receiving a player input to initiate a further player initiated event in the progression of evolving player initiated events in the continuing game player experience.

18. The method of claim 17, further comprising storing the game information on a player identification card in the form of a smart card, a magnetic card, or other memory device.

19. The method of claim 17, further comprising storing the game information on a central database coupled to a network coupled to the first and second gaming machines.

20. The method of claim 17, further comprising storing further game information representing a completed status of the wagering game after completing the wagering game.

21. The method of claim 20, further comprising unlocking a feature of another wagering game in response to loading said completed status of the wagering game into the another wagering game, the features being a game play elements that is not available to the player unless the first wagering game is completed.

22. The method of claim 21, wherein the another wagering game is a sequel to the wagering game.

* * * * *